United States Patent
Kim et al.

(10) Patent No.: US 9,577,821 B2
(45) Date of Patent: Feb. 21, 2017

(54) FUNCTION MASKING APPARATUS IN SYMMETRIC CRYPTOGRAPHIC ALGORITHM FOR PREVENTING SIDE CHANNEL ATTACKS AND METHOD THEREOF

(71) Applicant: ELECTRONICS AND TELECOMMUNICATIONS RESEARCH INSTITUTE, Daejeon (KR)

(72) Inventors: Tae Sung Kim, Daejeon (KR); Doo Ho Choi, Cheonan-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 14/680,320

(22) Filed: Apr. 7, 2015

(65) Prior Publication Data

US 2015/0312027 A1    Oct. 29, 2015

(30) Foreign Application Priority Data

Apr. 25, 2014    (KR) .................. 10-2014-0049789

(51) Int. Cl.
  *H04L 29/06*    (2006.01)
  *H04L 9/00*    (2006.01)
(52) U.S. Cl.
  CPC .............. *H04L 9/002* (2013.01); *H04L 9/003* (2013.01); *H04L 2209/04* (2013.01); *H04L 2209/24* (2013.01)

(58) Field of Classification Search
  CPC ......... H04L 9/02; H04L 9/03; H04L 2209/04; H04L 2209/24
  USPC .................................................. 380/28, 259
  See application file for complete search history.

(56) References Cited

U.S. PATENT DOCUMENTS

| | | | | | |
|---|---|---|---|---|---|
| 5,943,248 | A | * | 8/1999 | Clapp | G06F 7/582 708/235 |
| 2002/0085710 | A1 | * | 7/2002 | Ananth | H04L 9/065 380/37 |
| 2005/0232430 | A1 | * | 10/2005 | Gebotys | H04L 9/003 380/286 |
| 2009/0158051 | A1 | * | 6/2009 | Michiels | H04L 9/002 713/189 |
| 2011/0013767 | A1 | * | 1/2011 | Kim | H04L 9/003 380/28 |

(Continued)

FOREIGN PATENT DOCUMENTS

| | | |
|---|---|---|
| KR | 10-2010-0059571 A | 6/2010 |
| KR | 10-2011-0020153 A | 3/2011 |
| KR | 10-2012-0129045 A | 11/2012 |

*Primary Examiner* — Sarah Su
(74) *Attorney, Agent, or Firm* — Rabin & Berdo, P.C.

(57) ABSTRACT

Disclosed is a function masking apparatus in a symmetric cryptographic algorithm for preventing side channel attacks, including: a controller creating lookup tables for one or more internal functions included in a high security and light weight (HIGHT) algorithm, respectively based on a plurality of non-linear functions, a plurality of linear functions, and a plurality of constants which are randomly generated; and a storage unit storing the lookup tables for one or more internal functions included in the generated HIGHT algorithm.

5 Claims, 9 Drawing Sheets

(56) References Cited

U.S. PATENT DOCUMENTS

| | | | |
|---|---|---|---|
| 2011/0044450 A1* | 2/2011 | Choi | H04L 9/003 380/28 |
| 2012/0170739 A1* | 7/2012 | Karroumi | H04L 9/0631 380/28 |
| 2012/0294439 A1* | 11/2012 | Choi | G06F 21/558 380/28 |
| 2013/0028412 A1* | 1/2013 | Coron | H04L 9/003 380/28 |
| 2013/0061061 A1* | 3/2013 | Farrugia | G09C 1/00 713/190 |
| 2013/0108039 A1* | 5/2013 | Gong | H04L 9/0662 380/28 |
| 2014/0101458 A1* | 4/2014 | Farrugia | G06F 21/125 713/190 |
| 2015/0098564 A1* | 4/2015 | Chamley | G09C 1/00 380/28 |
| 2015/0110266 A1* | 4/2015 | Debraize | H04L 9/003 380/30 |
| 2015/0121035 A1* | 4/2015 | Steele, Jr. | G06F 12/1018 711/216 |
| 2015/0312027 A1* | 10/2015 | Kim | H04L 9/003 380/28 |
| 2016/0127123 A1* | 5/2016 | Johnson | H04L 9/003 713/189 |

* cited by examiner

FUNCTION MASKING APPARATUS IN SYMMETRIC CRYPTOGRAPHIC ALGORITHM FOR PREVENTING SIDE CHANNEL ATTACKS AND METHOD THEREOF

CROSS-REFERENCE TO RELATED APPLICATIONS

This application claims priority to and the benefit of Korean Patent Application No. 10-2014-0049789 filed in the Korean Intellectual Property Office on Apr. 25, 2014 the entire contents of which are incorporated herein by reference.

TECHNICAL FIELD

The present invention relates to a function masking apparatus in a symmetric cryptographic algorithm for preventing side channel attacks and a method thereof, and particularly, to a function masking apparatus in a symmetric cryptographic algorithm for preventing side channel attacks, which randomly changes an intermediate execution process even though a result of the cryptographic algorithm is not changed and a method thereof.

BACKGROUND ART

Side channel attacks are a cryptograph analysis technique based on a grey-box model that can collect various pieces of additional information generated while a cryptographic module is driven unlike a cryptography analysis method based on a theoretical black box model in the related art.

All intermediate values used for a cryptographic operation need to be randomized in order to implement a cryptographic algorithm so as to be safe to the side channel attacks. As a result, most side channel attack corresponding cryptographic algorithms are based on a data masking technique for randomizing the intermediate value. The data masking technique has performance enough to be actually used when certain degree of performance deterioration is considered for a primary differential power analysis attack response. However, when the data masking technique is applied so as to prevent even higher order differential power analysis attacks, performance deterioration increases by hundreds of times as compared with a standard cryptographic algorithm without side channel prevention, and as a result, it is impossible to use the data masking technique in an actual system.

SUMMARY OF THE INVENTION

The present invention has been made in an effort to provide a function masking apparatus in a symmetric cryptographic algorithm for preventing side channel attacks, which provides function masking of internal functions of a cryptographic algorithm and a method thereof.

The present invention has also been made in an effort to provide a function masking apparatus in a symmetric cryptographic algorithm for preventing side channel attacks, which applies function masking to the symmetric cryptographic algorithm such as a high security and light weight (HIGHT) and a method thereof.

An exemplary embodiment of the present invention provides a function masking apparatus in a symmetric cryptographic algorithm for preventing side channel attacks, including: a controller creating lookup tables for one or more internal functions included in a high security and light weight (HIGHT) algorithm, respectively based on a plurality of non-linear functions, a plurality of linear functions, and a plurality of constants which are randomly generated; and a storage unit storing the lookup tables for one or more internal functions included in the generated HIGHT algorithm.

The non-linear function may be a 4-bit function for a confusion effect and the linear function may be an 8-bit function for a diffusion effect.

The controller may create lookup tables corresponding to a function corresponding to initial conversion, a round function, and a function corresponding to final conversion, which are included in the HIGHT algorithm, respectively based on the plurality of non-linear functions, the plurality of linear functions, and the plurality of constants which are generated.

The controller may create the lookup tables for one or more internal functions included in the HIGHT algorithm, respectively through function making.

When a plaintext is received, the controller may output a cryptogram corresponding to the plaintext based on the created lookup table.

Another exemplary embodiment of the present invention provides a function masking method in a symmetric cryptographic algorithm for preventing side channel attacks, including: randomly generating, by a controller, a plurality of non-linear functions, a plurality of linear functions, and a plurality of constants; and creating, by the controller, lookup tables for one or more internal functions included in a high security and light weight (HIGHT) algorithm based on the plurality of non-linear functions, the plurality of linear functions, and the plurality of constants which are generated, respectively.

As one example associated with the present invention, the one or more internal functions include a law addition function, an XOR function, F0, and F1 included in the HIGHT algorithm $F_0$ may indicate a result of performing an XOR operation of a plurality of values which are left cyclic shifted by 1 bit, 2 bits, and 7 bits with respect to a 8-bit value and the $F_1$ may indicate a result of performing the XOR operation of a plurality of values which are left cyclic shifted by 3 bits, 4 bits, and 6 bits with respect to the 8-bit value.

The method may further include outputting, by the controller, when a plaintext is received, a cryptogram corresponding to the plaintext based on the created lookup table.

According to exemplary embodiments of the present invention, a function masking apparatus in a symmetric cryptographic algorithm for preventing side channel attacks and a method thereof provide function masking of internal functions of a cryptographic algorithm to efficiently respond to high-order differential power analysis attacks because the internal functions of the cryptographic algorithm cannot be predicted.

The function masking apparatus in a symmetric cryptographic algorithm for preventing side channel attacks and the method thereof apply function masking to a symmetric cryptographic algorithm such as a HIGHT to improve efficiency of an entire system.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
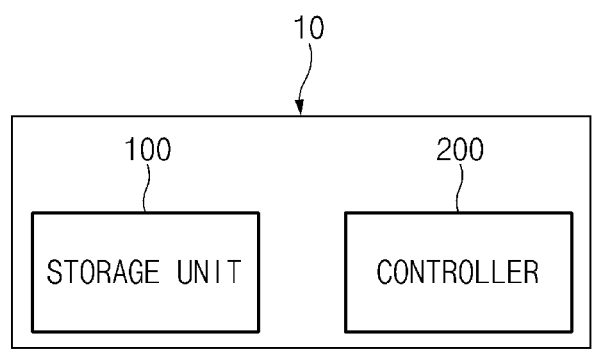
FIG. 1 is a configuration diagram of a function masking apparatus in a symmetric cryptographic algorithm according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the present invention are used to just describe a specific exemplary embodiment and do not intend to limit the present invention. Further, unless otherwise defined in the present invention, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Moreover, unless otherwise apparently specified contextually, a singular expression used in the present invention includes a plural expression. In the present invention, a term such as "comprising" or "including" should not be interpreted as necessarily including all various components or various steps disclosed in the invention, and it should be interpreted that some components or some steps among them may not be included or additional components or steps may be further included.

In addition, terms including ordinal numbers, such as "first" and "second", used in the present invention can be used to describe various components, but the components should not be limited by the terms. The above terminologies are used only for distinguishing one component from the other component. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

FIG. 1 is a configuration diagram of a function masking apparatus 10 in a symmetric cryptographic algorithm according to an exemplary embodiment of the present invention.

As illustrated in FIG. 1, the function masking apparatus 10 includes a storage unit 100 and a controller 200. All constituent elements of the function masking apparatus 10 illustrated in FIG. 1 are not required, and the function masking apparatus 10 may be implemented by more or fewer constituent elements than the constituent elements illustrated in FIG. 1.

Instead of preventing side channel attacks through randomization of intermediate value data processed in a cryptographic algorithm, one or more internal functions included in a height security and light weight (HIGHT) which is the symmetric cryptographic algorithm are masked (alternatively, function-masked) to prevent the side channel attacks.

The storage unit 100 stores data and a program required for operating the function masking apparatus 10.

Further, the storage unit 100 stores various user interfaces (UIs), graphic user interfaces (GUIs), and the like.

In addition, the storage unit 100 may include at least one storage medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the function masking apparatus 10 may operate a web storage that performs a storage function of the storage unit 100 on the Internet or operate in association with the web storage.

The controller 200 controls an overall operation of the function masking apparatus 10.

Further, the controller 200 stores each of the internal functions of the HIGHT algorithm depending on initial conversion, a round function, and final conversion for the HIGHT algorithm which is a 64-bit block cryptographic algorithm that supports a secret key of 128 bits in the storage unit 100. Herein, the HIGHT algorithm outputs a 64-bit cryptogram from a 128-bit master key and a 64-bit plaintext, and has a Feistel structure.

Figure 2:
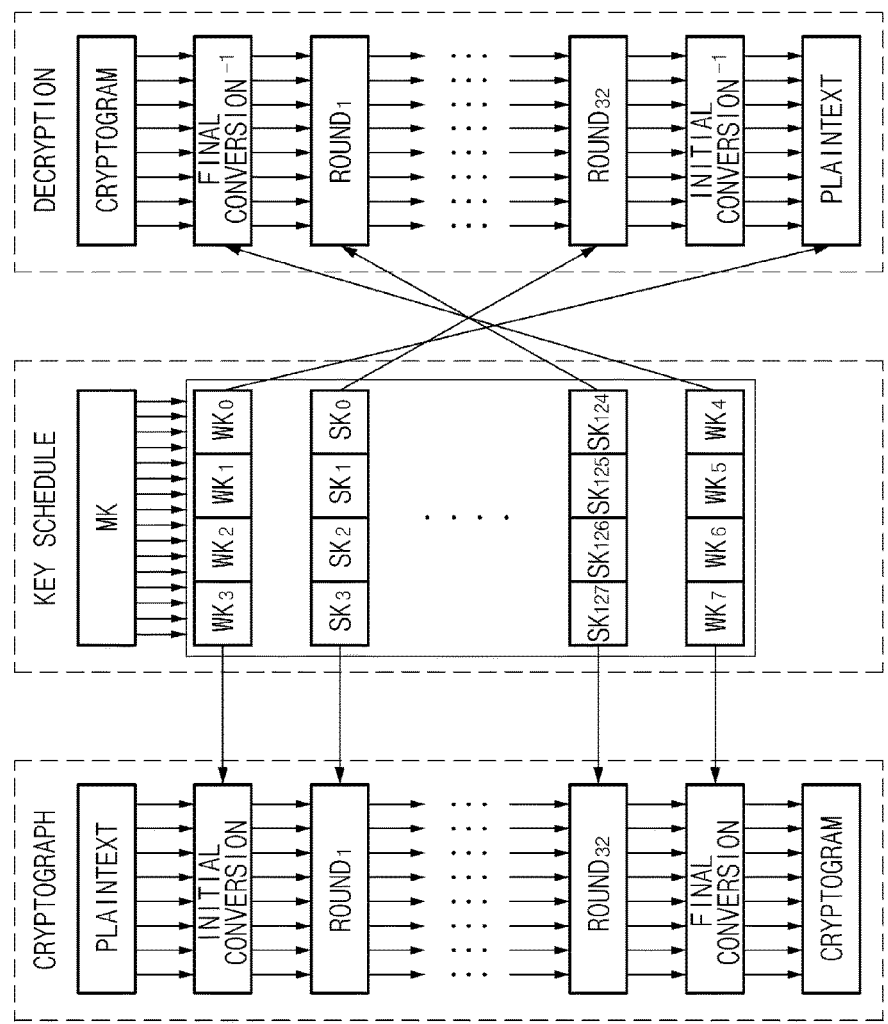
FIG. 2 is a diagram illustrating a generalized Feistel structure of a HIGHT algorithm according to the exemplary embodiment of the present invention.

That is, the HIGHT algorithm has a generalized Feistel structure as illustrated in FIG. 2.

Herein, each of the 64-bit plaintext P and the 64-bit cryptogram C is configured by 8 bytes and expressed as shown in [Equation 1] given below.

$$P=P_7\|P_6\|P_5\|P_4\|P_3\|P_2\|P_1\|P_0$$

$$C=C_7\|C_6\|C_5\|C_4\|C_3\|C_2\|C_1\|C_0 \quad \text{[Equation 1]}$$

Further, an input/output of the 64-bit round function (alternatively, an output value Xi of each round) is configured by 8 bytes and expressed as shown in [Equation 2] given below.

$$X_i=X_{i,7}\|X_{i,6}\|X_{i,5}\|X_{i,4}\|X_{i,3}\|X_{i,2}\|X_{i,1}\|X_{i,0}, i=0,\ldots 32 \quad \text{[Equation 2]}$$

Further, a cryptography key (alternatively, master key) (MK) which is secret information used for cryptograph or decryption a plaintext or a cryptogram which is a 128-bit key is configured by 16 bytes and expressed as shown in [Equation 3] given below.

$$MK=MK_{15}\|MK_{14}\|\ldots\|MK_1\|MK_0 \quad \text{[Equation 3]}$$

In addition, a round key applied to the round function is constituted by a whitening key WKi and a sub key SKi generated based on a left feedback shift register (LFSR), and expressed as shown in [Equation 4] given below.

$$SK_i, i=0,\ldots,127$$

$$WK_i, i=0,\ldots,7 \quad \text{[Equation 4]}$$

Herein, the whitening key is applied to initial conversion or final conversion of an algorithm in order to increase safety in a block cipher having a repetition structure. Further, the controller 200 generates the whitening key through [Equation 5] given below based on the master key.

$$WK_i = \begin{cases} MK_{i+12}, & 0 \le i \le 3 \\ MK_{i-4}, & 4 \le i \le 7 \end{cases} \quad \text{[Equation 5]}$$

Further, the round function has two sub functions as shown in [Equation 6] given below.

$$F_0(X)=X^{\lll 1}\oplus X^{\lll 2}\oplus X^{\lll 7}$$

$$F_1(X)=X^{\lll 3}\oplus X^{\lll 4}\oplus X^{\lll 6} \quad \text{[Equation 6]}$$

Herein, law addition is represented by $\boxplus$, XOR (exclusive logical addition) is represented by $\oplus$, and X<<S represents s-bit left cyclic shift for X which is a 8-bit value.

Further, the controller 200 defines the initial conversion, the round function, and the final conversion for cryptograph in the HIGHT algorithm as described below.

The initial conversion of the HIGHT cryptograph converts the plaintext P into $X0=X0,7\|X0,6\|\ldots\|X0,0$ which is an input of a first round function based on four whitening keys (for example, WK0, WK1, WK2, and WK3).

That is, the initial conversion of the HIGHT cryptograph is expressed as shown in [Equation 7] given below.

$$X_{0,i}=P_i, i=1,3,5,7$$

$$X_{0,0}=P_0\boxplus WK_0$$

$$X_{0,2}=P_2\oplus WK_1$$

$$X_{0,4}=P_4\boxplus WK_2$$

$$X_{0,6}=P_6\oplus WK_3 \quad \text{[Equation 7]}$$

Further, the round function of the HIGHT cryptograph is repeated 32 times from Round 1 to Round 32.

That is, the round function (Round i=0 to 31) of the HIGHT cryptograph is expressed as shown in [Equation 8] given below.

$$X_{i+1,0}=X_{i,7}\oplus(F_0(X_{i,6})\boxplus SK_{\mu+3})$$

$$X_{i+1,1}=X_{i,0}$$

$$X_{i+1,2}=X_{i,1}\boxplus(F_1(X_{i,0})\oplus SK_{\mu+2})$$

$$X_{i+1,3}=X_{i,2}$$

$$X_{i+1,4}=X_{i,3}\oplus(F_0(X_{i,2})\boxplus SK_{\mu+1})$$

$$X_{i+1,5}=X_{i,4}$$

$$X_{i+1,6}=X_{i,5}\boxplus(F_1(X_{i,4})\oplus SK_{\mu})$$

$$X_{i+1,7}=X_{i,6} \quad \text{[Equation 8]}$$

Further, the final conversion of the HIGHT cryptograph converts $X32=X32,7\|X32,6\|\ldots\|X32,0$ which is an output of a $32^{nd}$ round function based on four whitening keys (for example, WK0, WK1, WK2, and WK3).

That is, the final conversion of the HIGHT cryptograph is expressed as shown in [Equation 9] given below.

$$C_0=X_{32,1}\boxplus WKE_4$$

$$C_1=X_{32,2}$$

$$C_2=X_{32,3}\oplus WKE_5$$

$$C_3=X_{32,4}$$

$$C_4=X_{32,5}\oplus WKE_6$$

$$C_5=X_{32,6}$$

$$C_6=X_{32,7}\boxplus WKE_7$$

$$C_7=X_{32,0} \quad \text{[Equation 9]}$$

As described above, the controller 200 defines the respective functions for the initial conversion, the round function, and the final conversion for the HIGHT algorithm and stores the defined functions in the storage unit 100.

Further, the controller 200 creates an lookup table for one or more corresponding functions and implements (alternatively, creates) the HIGHT algorithm applied with the function masking through a method for inquiring the created lookup table, in order to randomly change one or more functions (alternatively, internal functions) included in the HIGHT algorithm. Herein, the function masking as a concept defined to describe a technical feature of the present invention maintains a method in which the existing cryptographic algorithms randomize intermediate value data, while the function masking is configured to mask the corresponding functions so that it is impossible to predict the internal functions of the cryptographic algorithm in the present invention, and the concept is defined as the function masking.

Further, the controller 200 randomly creates a plurality of non-linear functions (for example, G and H) for a confusion effect, a plurality of linear functions (for example, L and M) for a diffusion effect, and a plurality of constants for a linear function for addition, respectively.

In addition, the controller 200 temporarily stores the plurality of non-linear functions, the plurality of linear functions, and the plurality of constants, which are generated, in the storage unit 100.

Moreover, the controller 200 creates the lookup table (or look-up table) for each of one or more internal functions (including, for example, an ADD function, an XOR function, $F_0$, $F_1$, and the like) included in the HIGHT algorithm based on the plurality of non-linear functions, the plurality of linear functions, and the plurality of constants which are generated. In this case, after the creation of the lookup table is completely completed, the plurality of non-linear functions, the plurality of linear functions, and the plurality of constants which are temporarily stored in the storage unit 100 are permanently deleted by the control by the controller 200.

Figure 3:
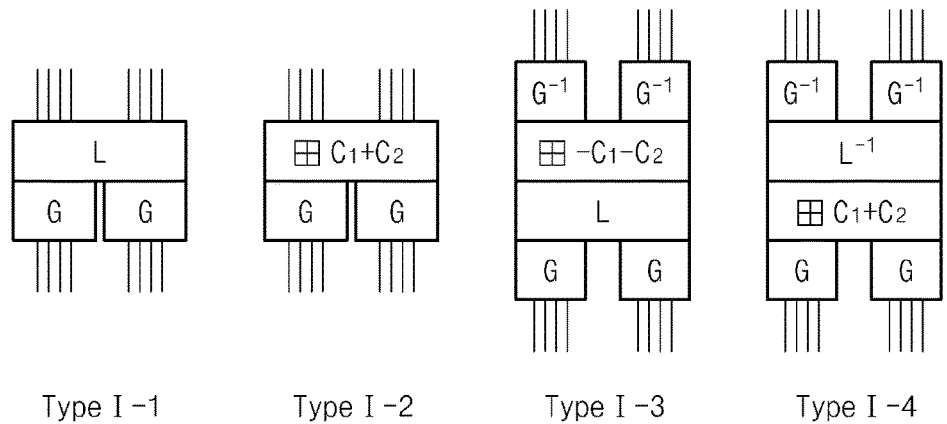
FIGS. 3 and 4 are diagrams illustrating an lookup table for initial conversion included in the HIGHT algorithm according to the exemplary embodiment of the present invention.

Herein, type I-1 (type I) illustrated in FIG. 3 is shown by [Equation 10] given below.

$$G \circ L \qquad \text{[Equation 10]}$$

As described above, in the case of type I-1, the controller 200 encodes 8-bit input (for example, $X_i$) based on a first linear function (for example, L) among the plurality of linear functions and a first non-linear function (for example, G) among the plurality of non-linear functions.

That is, in the case of type I-1, the controller 200 calculates the 8-bit input through the first linear function (for example, L) among the plurality of linear functions, transfers upper 4 bits in results of calculating the corresponding linear function as an input of the first non-linear function (for example, G illustrated at a left side of FIG. 3) among the plurality of non-linear functions, and transfers lower 4 bits in the results of calculating the linear function as an input of the first non-linear function (for example, G at a right side) among the plurality of non-linear functions.

Thereafter, two first non-linear functions (for example, G at the left and right sides) calculate the respective bits (for example, upper 4 bits or lower 4 bits) and output the calculation result (alternatively, output the calculation result to type I-1 in the round function).

As described above, the created lookup table may be displayed through the non-linear function, the linear function, the constant, and the round key (including for example, the whitening key, the sub key, and the like).

Further, type I-2 illustrated in FIG. 3 is shown by [Equation 11] given below.

$$G \circ \text{ADD}(\text{Const}1 + \text{Const}2, X_i) \qquad \text{[Equation 11]}$$

As described above, in the case of type I-2, the controller 200 performs a law addition operation of the 8-bit input (for example, $X_i$) and the sum of the plurality of constants (for example, $\text{Const}(=\text{Const}_1+\text{Const}_2)$) and encodes a result of performing the law addition calculation based on the first non-linear function (for example, G) among the plurality of non-linear functions.

That is, in the case of type I-2, the controller 200 performs a law addition operation of the 8-bit input (for example, $X_i$) and the sum (for example, Const) of the plurality of constants, and transfers upper 4 bits in results of performing the law addition operation as the input of the first non-linear function (for example, G at the left side) among the plurality of non-linear functions and transfers lower 4 bits in the results of performing the law addition operation as the input of the first non-linear function (for example, G at the right side) among the plurality of non-linear functions. Thereafter, two first non-linear functions (for example, G at the left and right sides) calculate the respective bits (for example, upper 4 bits or lower 4 bits) and output the calculation result.

Further, type I-3 illustrated in FIG. 3 is shown by [Equation 12] given below.

$$G \circ L \circ \text{ADD}(-\text{Const}1-\text{Const}2, G^{-1}(X_i)) \qquad \text{[Equation 12]}$$

As described above, in the case of type I-3, the controller 200 performs the law addition operation of the 8-bit input (for example, $X_i$) and the sum (for example, $\text{Const}(=\text{Const}_1-\text{Const}_2)$) of an inverse function (for example, $G^{-1}$) of the first non-linear function among the plurality of non-linear functions and the plurality of constants, and performs decoding based on the law addition calculation result and the first linear function (for example, L) among the plurality of linear functions and encodes a decoding result based on the first non-linear function (for example, G) among the plurality of non-linear functions.

That is, in the case of type I-3, the controller 200 calculates the 8-bit input (for example, $X_i$) through two inverse functions (for example, $G^{-1}$) of the first non-linear function among the plurality of non-linear functions, performs the law addition calculation with the sum (for example, Const) of the plurality of constants with respect to the result of calculating the inverse function of two non-linear functions, calculates the law addition calculation result through the first linear function (for example, L) among the plurality of linear functions, transfers upper 4 bits in the results of calculating the corresponding first linear function as the input of the first non-linear function (for example, G at the left side) among the plurality of non-linear functions, and transfers lower 4 bits in the result of performing the law addition operation as the input of the first non-linear function (for example, G at the right side) among the plurality of non-linear functions.

Thereafter, two first non-linear functions (for example, G at the left and right sides) calculate the respective bits (for example, upper 4 bits or lower 4 bits) and output the calculation result.

Further, type I-4 illustrated in FIG. 3 is shown by [Equation 13] given below.

$$G \circ \text{ADD}(\text{Const}1+\text{Const}2, (L^{-1} \circ G^{-1}(X_i))) \qquad \text{[Equation 13]}$$

As described above, in the case of type I-4, the controller 200 decodes the 8-bit input (for example, $X_i$) based on the inverse function (for example, $G^{-1}$) of the first non-linear function among the plurality of non-linear functions and the inverse function (for example, $L^{-1}$) of the first linear function among the plurality of linear functions, performs the law addition operation of the decoding result and the sum of the plurality of constants (for example, $\text{Const}(=\text{Const}_1+\text{Const}_2)$), and encodes a result of performing the law addition operation based on the first non-linear function (for example, G) among the plurality of non-linear functions.

That is, in the case of type I-4, the controller 200 calculates the 8-bit input (for example, $X_i$) through two inverse functions (for example, $G^{-1}$) of the first non-linear function among the plurality of non-linear functions, calculates the calculation result of the inverse functions of two non-linear functions through the inverse function (for example, $L^{-1}$) of the first linear function among the plurality of linear functions, performs the law addition operation of the calculation result of the inverse function of the corresponding first linear function and the sum (for example, Const) of the plurality of constants, transfers upper 4 bits in the results of the law addition operation as the input of the first non-linear function (for example, G at the left side) among the plurality of non-linear functions, and transfers lower 4 bits in the results of performing the law addition operation as the input of the first non-linear function (for example, G at the right side) among the plurality of non-linear functions.

Thereafter, two first non-linear functions (for example, G at the left and right sides) calculate the respective bits (for example, upper 4 bits or lower 4 bits) and output the calculation result.

Figure 4:
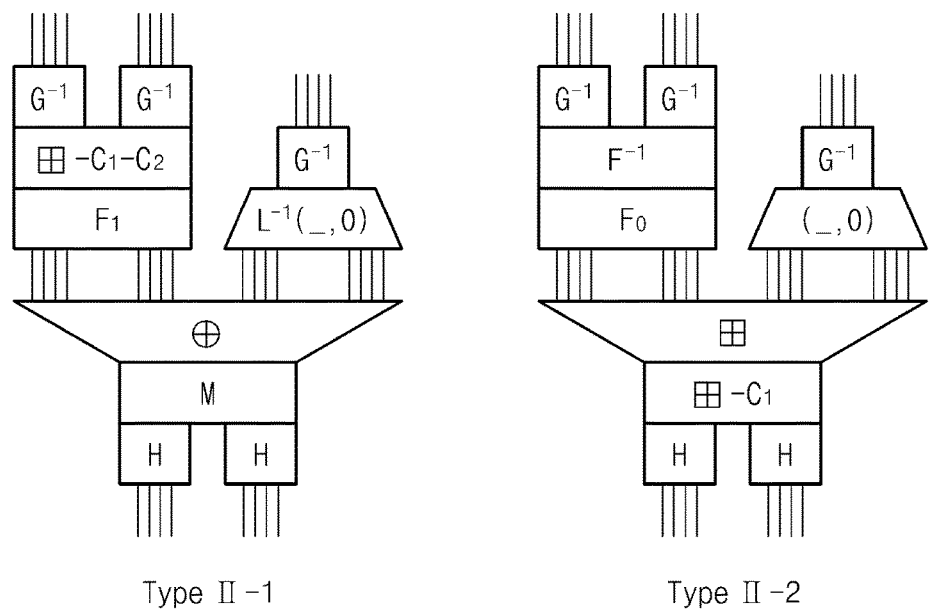

Meanwhile, type II-1 illustrated in FIG. 4 is shown by [Equation 14] given below.

$$H \circ M \circ XOR(L^{-1}(\_,0) \circ G^{-1}, F_1 \circ ADD(-Const1-Const2, G^{-1}))$$ [Equation 14]

As described above, in the case of type II-1, the controller 200 performs the law addition operation of an input of upper 8 bits in an input of 12 bits and the sum (for example, $Const(=-Const_1-Const_2)$) of the inverse function (for example, $G^{-1}$) of the first non-linear function among the plurality of non-linear functions and the plurality of constants, performs first decoding of a result of performing the law addition operation based on $F_1$, performs second decoding of an input of lower 4 bits in the input of 12 bits based on the inverse function (for example, $G^{-1}$) of the first non-linear function among the plurality of non-linear functions and the inverse function (for example, $L^{-1}(\_,0)$) of the first linear function among the plurality of linear functions, performs the XOR operation of the first decoding result and the second decoding result, and encodes a result of performing the XOR operation based on the second linear function (for example, M) among the plurality of linear functions and the second non-linear function (for example, H) among the plurality of non-linear functions. Herein, the input of 12 bits may correspond to each of an output of type I and an upper 4-bit output of type II-2.

That is, in the case of type II-1, the controller 200 calculates the 8-bit input (for example, $X_i$) through two inverse functions (for example, $G^{-1}$) of the first non-linear function among the plurality of non-linear functions, performs the law addition operation of the calculation result of the inverse functions of two non-linear functions and the sum of (for example, Const) of the plurality of constants, performs first calculation of the law addition operation result based on $F_1$, calculates the low 4-bit input in the input of 12 bits through the inverse function (for example, $G^{-1}$) of the first non-linear function among the plurality of non-linear functions, performs second calculation of a calculation result of the inverse function of the first non-linear function through the inverse function (for example, $L^{-1}(\_,0)$) of the first linear function among the plurality of linear functions, performs the XOR operation of first and second calculation results, calculates a result of performing the XOR operation through the second linear function (for example, M) among the plurality of linear functions, transfers upper 4 bits in a calculation result of the corresponding second linear function as the input of the second non-linear function (for example, H at the left side) among the plurality of non-linear functions, and transfers lower 4 bits in the calculation result of the second linear function as the input of the second non-linear function (for example, H at the right side) among the plurality of non-linear functions.

Thereafter, the respective non-linear functions (for example, H at the left and right sides) calculate the respective bits (for example, upper 4 bits or lower 4 bits) and output a calculation result.

Herein, the calculation through the inverse function (for example, $L^{-1}(\_,0)$) of the first linear function means that a calculation result of the inverse function of the first non-linear function is calculated through the inverse function (for example, $L^{-1}$) of the first linear function, and the calculation result of the inverse function of the corresponding first linear function is configured by upper 4 bits and 0 is added (alternatively, inserted) to (into) lower 4 bits to output a total of 8 bits.

Further, type II-2 illustrated in FIG. 4 is shown by [Equation 15] given below.

$$H \circ M \circ ADD(-Const1, ADD((\_,0)) \circ G^{-1}, F_0 \circ L^{-1} \circ G^{-1}))$$ [Equation 15]

As described above, in the case of type II-2, the controller 200 calculates the input of upper 8 bits in the input of 12 bits based on the inverse function (for example, $G^{-1}$) of the first non-linear function among the plurality of non-linear functions and the inverse function (for example, $L^{-1}$) of the first linear function among the plurality of linear functions, performs first decoding of a calculation result based on $F_0$, performs second decoding of the input of lower 4 bits in the input of 12 bits based on the inverse function (for example, $G^{-1}$) of the first non-linear function among the plurality of non-linear functions and a bit value '0' addition function (alternatively, calculation), performs the law addition operation of a first decoding result and a second decoding result, performs the law addition operation of a law addition operation result and a first constant (for example, −Const1), and encodes the law addition operation result based on the second linear function (for example, M) among the plurality of linear functions and the second non-linear function (for example, H) among the plurality of non-linear functions.

That is, in the case of type II-2, the controller 200 calculates the input of upper 8 bits in the input of 12 bits through two inverse functions (for example, $G^{-1}$) of the first non-linear function among the plurality of non-linear functions, calculates a calculation result of the inverse functions of two non-linear functions based on the inverse function (for example, $L^{-1}$) of the first linear function among the plurality of linear functions, performs first calculation of the calculation result based on $F_0$, calculates the input of lower 4 bits in the input of 12 bits through the inverse function (for example, $G^{-1}$) of the first non-linear functions among the plurality of non-linear functions, performs second calculation of the calculation result of the inverse function of the first non-linear function by adding the bit value '0' to lower 4 bits (for example, $(\_,0)$), primarily performs the law addition operation of results of performing the first calculation and the second calculation, secondarily performs the law addition operation of a result of the primary law addition operation and the first constant (for example, −Const1), calculates a result of the secondary law addition operation through the second linear function (for example, M) among the plurality of linear functions, transfers upper 4 bits in a calculation result of the corresponding second linear function as an input of the second non-linear function (for example, H at the left side) among the plurality of non-linear functions, and transfers lower 4 bits in the calculation result of the second linear function as the input of the second non-linear function (for example, H at the right side) among the plurality of non-linear functions.

Thereafter, the respective non-linear functions (for example, H at the left and right sides) calculate the respective bits (for example, upper 4 bits or lower 4 bits) and output a calculation result.

Herein, the calculation through the bit value '0' addition function (alternatively, calculation) (for example, $(\_,0)$) means that the calculation result of the inverse function (for example, $G^{-1}$) of the first non-linear function is added (alternatively, configured) to (in) upper 4 bits and 0 is added (alternatively, inserted) to (into) lower 4 bits to a total of 8 bits.

Figure 5:
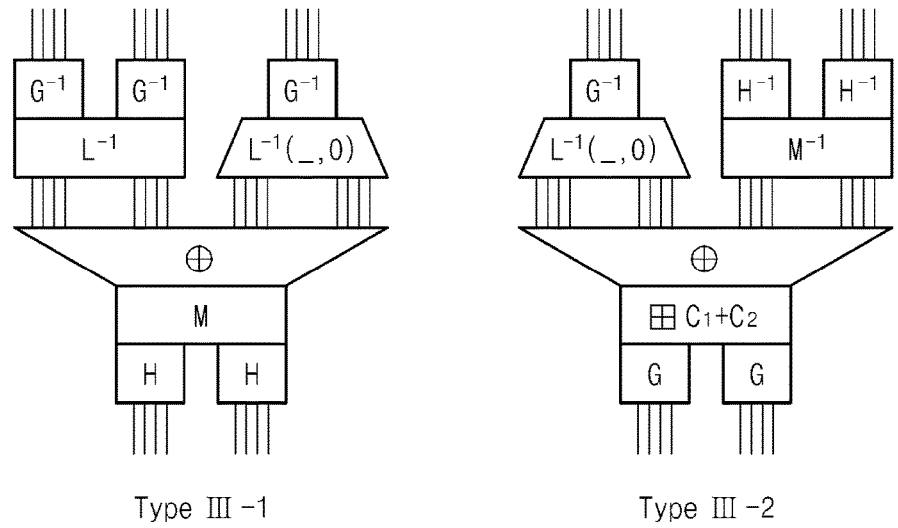
FIGS. 5 to 7 are diagrams illustrating an lookup table for a round function included in the HIGHT algorithm according to the exemplary embodiment of the present invention.

Type III-1 illustrated in FIG. 5 is shown by [Equation 16] given below.

$$H \circ M \circ XOR(L^{-1}(\_,0) \circ G^{-1}, L^{-1} \circ G^{-1})$$ [Equation 16]

As described above, in the case of type III-1, the controller 200 performs first decoding of the input of upper 8 bits in the input of 12 bits based on the inverse function (for example, $G^{-1}$) of the first non-linear function among the plurality of non-linear functions and the inverse function (for example, $L^{-1}$) of the first linear function among the plurality of linear functions, performs second decoding of the input of lower 4 bits in the input of 12 bits based on the inverse function (for example, $G^{-1}$) of the first non-linear function among the plurality of non-linear functions and the inverse function ($L^{-1}(\_,0)$) of the first linear function among the plurality of linear functions, performs the XOR operation of a result of the first decoding and a result of the second decoding, and encodes a result of the XOR operation based on the second linear function (for example, M) among the plurality of linear functions and the second non-linear function (for example, H) among the plurality of non-linear functions.

That is, in the case of type III-1, the controller 200 calculates the input of upper 8 bits in the input of 12 bits through two inverse functions (for example, $G^{-1}$) of the first non-linear function among the plurality of non-linear functions, performs first calculation of a calculation operation result of the inverse functions of two non-linear functions through the inverse function (for example, $L^{-1}$) of the first linear function among the plurality of linear functions, calculates the input of lower 4 bits in the input of 12 bits through the inverse function (for example, $G^{-1}$) of the first non-linear function among the plurality of non-linear functions, performs second calculation of a calculation result of the inverse function of the second non-linear function through the inverse function (for example, $L^{-1}(\_,0)$) of the first linear function among the plurality of linear functions, performs the XOR operation of results of performing the first calculation and the second calculation, calculates a result of performing the XOR operation through the second linear function (for example, M) among the plurality of linear functions, transfers upper 4 bits in the calculation result of the corresponding second linear function as the input (for example, H at the left side) of the second non-linear function among the plurality of non-linear functions, and transfers lower 4 bits in the calculation result of the second linear function as the input of the second non-linear function (for example, H at the right side) among the plurality of non-linear functions.

Thereafter, the respective non-linear functions (for example, H at the left and right sides) calculate the respective bits (for example, upper 4 bits or lower 4 bits) and output a calculation result.

Herein, the calculation through the inverse function (for example, $L^{-1}(\_,0)$) of the first linear function means that the calculation result of the inverse function of the first non-linear function is calculated through the inverse function of the first linear function, and the calculation result of the inverse function of the corresponding first linear function is configured by upper 4 bits and 0 is added (alternatively, inserted) to (into) lower 4 bits to output a total of 8 bits.

Further, type III-2 illustrated in FIG. 5 is shown by [Equation 17] given below.

$$G \circ ADD(Const_1 + Const_2, XOR(M^{-1} \circ H^{-1}, L^{-1}(0,\_) \circ G^{-1}))$$ [Equation 17]

As described above, in the case of type III-2, the controller 200 performs first decoding of the input of upper 4 bits in the input of 12 bits based on the inverse function (for example, $G^{-1}$) of the first non-linear function among the plurality of non-linear functions and the inverse function (for example, $L^{-1}(0,\_)$) of the first linear function among the plurality of linear functions, performs second decoding of the input of lower 8 bits in the input of 12 bits based on the inverse function (for example, $H^{-1}$) of the second non-linear function among the plurality of non-linear functions and the inverse function (for example, $M^{-1}$) of the second linear function among the plurality of linear functions, performs the XOR operation of a result of the first decoding and a result of the second decoding, performs the law addition operation of a result of performing the XOR operation and the sum (for example, $Const(=Const_1+Const_2)$) of the plurality of constants, and encodes a result of the law addition operation based on the first non-linear function (for example, G) among the plurality of non-linear functions.

That is, in the case of type III-2, the controller 200 calculates the input of upper 4 bits in the input of 12 bits through the inverse functions (for example, $G^{-1}$) of the first non-linear function among the plurality of non-linear functions, performs first calculation of a calculation result of the inverse functions of the first non-linear function through the inverse function (for example, $L^{-1}(0,\_)$) of the first linear function among the plurality of linear functions, calculates the input of lower 8 bits in the input of 12 bits through the inverse function (for example, $H^{-1}$) of the second non-linear function among the plurality of non-linear functions, performs second calculation of a calculation result of the inverse function of the second non-linear function through the inverse function (for example, $M^{-1}$) of the second linear function among the plurality of linear functions, performs the XOR operation of results of the first calculation and the second calculation, performs the law addition operation of a result of the XOR operation and the sum (for example, Const) of the plurality of constants, transfers upper 4 bits in a result of performing the law addition operation as the input (for example, G at the left side) of the first non-linear function among the plurality of non-linear functions, and transfers lower 4 bits in the calculation result of the first linear function as the input of the first non-linear function (for example, G at the right side) among the plurality of non-linear functions.

Thereafter, the respective non-linear functions (for example, G at the left and right sides) calculate the respective bits (for example, upper 4 bits or lower 4 bits) and output a calculation result.

Herein, the calculation through the inverse function (for example, $L^{-1}(\_,0)$) of the first linear function means that a calculation result of the inverse function of the first non-linear function is calculated through the inverse function (for example, $M^{-1}$) of the first linear function, and the calculation result of the inverse function of the corresponding first linear function is configured by lower 4 bits and 0 is added (alternatively, inserted) to (into) upper 4 bits to output a total of 8 bits.

Figure 6:
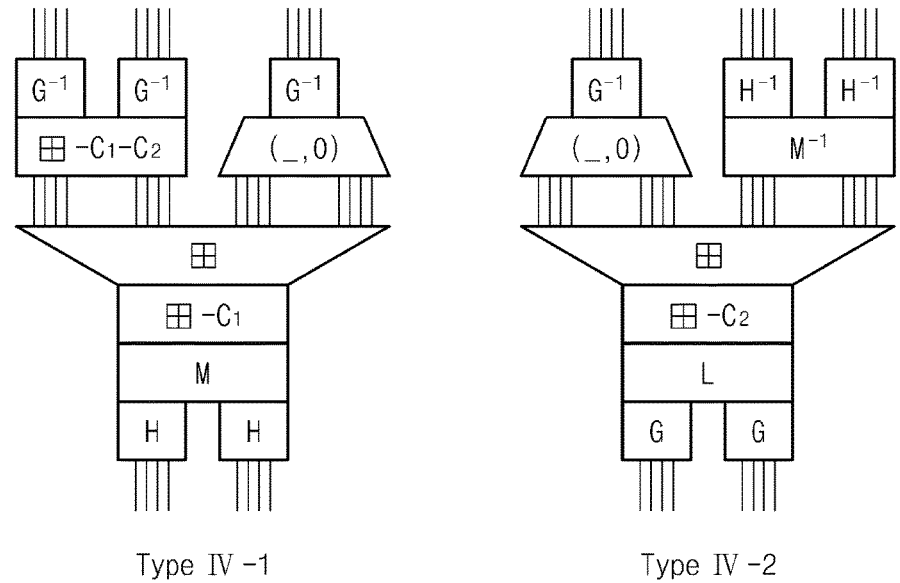

Further, type IV-1 illustrated in FIG. 6 is shown by [Equation 18] given below.

$$H \circ M \circ ADD(-Const_1, ADD(\_,0) \circ, ADD(-Const_1 - Const_2, G^{-1})))$$ [Equation 18]

As described above, in the case of type IV-1, the controller 200 performs first decoding of the input of upper 8 bits in the input of 12 bits based on a result of performing a law addition operation of the inverse function (for example, $G^{-1}$) of the first non-linear function among the plurality of non-linear functions and the sum (for example, Const(=−

Const$_1$–Const$_2$)) of the plurality of constants, performs second decoding of the input of lower 4 bits in the input of 12 bits based on the inverse function (for example, G$^{-1}$) of the first non-linear function and the bit value '0' addition function (alternatively, calculation) among the plurality of non-linear functions, performs the law addition operation of results of the first decoding and the second decoding, performs the law addition operation of a result of performing the law addition operation and a first constant (for example, –Const1), and encodes the law addition operation result based on the second linear function (for example, M) among the plurality of linear functions and the second non-linear function (for example, H) among the plurality of non-linear functions.

That is, in the case of type IV-1, the controller 200 calculates the input of upper 8 bits in the input of 12 bits through two inverse functions (for example, G$^{-1}$) of the first non-linear function among the plurality of non-linear functions, performs first calculation by performing the law addition operation of a calculation result of the inverse functions of two non-linear functions and the sum (for example, Const) of the plurality of constants, calculates the input of lower 4 bits in the input of 12 bits through the inverse function (for example, H$^{-1}$) of the second non-linear functions among the plurality of non-linear functions, performs second calculation by adding a bit value '0' to lower 4 bits (for example, (_,0)) based on the calculation result of the inverse function of the second non-linear function, primarily performs the law addition operation of results of the first calculation and the second calculation, secondarily performs the law addition operation of a result of performing the primary law addition operation and the first constant (for example, –Const1), calculates a result of performing the secondary law addition operation through the second linear function (for example, M) among the plurality of linear functions, transfers upper 4 bits in the calculation result of the second linear function as the input of the second non-linear function (for example, H at the left side) among the plurality of non-linear functions, and transfers lower 4 bits in the calculation result of the second linear function as the input of the second non-linear function (for example, H at the right side) among the plurality of non-linear functions.

Thereafter, the respective non-linear functions (for example, H at the right side) calculate the respective bits (for example, upper 4 bits or lower 4 bits) and output a calculation result.

Herein, the calculation through the bit value '0' addition function (alternatively, calculation) (for example, (_,0)) means that the calculation result of the inverse function (for example, G$^{-1}$) of the first non-linear function is added (alternatively, configured) to (in) upper 4 bits and 0 is added (alternatively, inserted) to (into) lower 4 bits to a total of 8 bits.

Further, type IV-2 illustrated in FIG. 6 is shown by [Equation 19] given below.

$$G \circ L \circ \text{ADD}(-\text{Const}_2, \text{ADD}(M^- \circ H^{-1}, (0,\_) \circ G^{-1})) \quad \text{[Equation 19]}$$

As described above, in the case of type IV-2, the controller 200 performs first decoding of the input of upper 4 bits in the input of 12 bits based on the inverse function (for example, G$^{-1}$) of the first non-linear function among the plurality of non-linear functions and the bit value '0' addition function (alternatively, calculation), performs second decoding an input of lower 8 bits in the input of 12 bits based on the inverse function (for example, H$^{-1}$) of the second non-linear function among the plurality of non-linear functions and the inverse function (for example, M$^{-1}$) of the second linear function among the plurality of linear functions, performs the law addition operation of results of the first decoding and the second decoding, performs the law addition operation of a result of performing the law addition operation and a second constant (for example, –Const2), and encodes the result of performing the law addition operation based on the first linear function (for example, L) among the plurality of linear functions and the first non-linear function (for example, G) among the plurality of non-linear functions.

That is, in the case of type IV-2, the controller 200 calculates the input of upper 4 bits in the input of 12 bits through the inverse function (for example, G$^{-1}$) of the first non-linear function among the plurality of non-linear functions, performs first calculation by adding the bit value '0' to upper 4 bits (for example, (0,_)) based on a calculation result of the inverse function of the first non-linear function, calculates the input of lower 8 bits in the input of 12 bits through the inverse functions (for example, H$^{-1}$) of two second non-linear functions, performs second calculation of a calculation result of the inverse function of the second non-linear function through the inverse function (for example, M$^{-1}$) of the second linear function among the plurality of linear functions, primarily performs the law addition operation of results of the first calculation and the second calculation, secondarily performs the law addition operation of a result of performing the primary law addition operation and the second constant (for example, –Const 2), calculates a result of performing the secondary law addition operation through the first linear function (for example, L) among the plurality of linear functions, transfers upper 4 bits in the calculation result of the corresponding first linear function as the input (for example, G at the left side) of the first non-linear function among the plurality of non-linear functions, and transfers lower 4 bits in the calculation result of any one linear function as the input of the first non-linear function (for example, G at the right side) among the plurality of non-linear functions.

Thereafter, the respective non-linear functions (for example, G at the left and right sides) calculate the respective bits (for example, upper 4 bits or lower 4 bits) and output a calculation result.

Herein, the calculation through the bit value '0' addition function (alternatively, calculation) (for example, (_,0)) means that the calculation result of the inverse function (for example, G$^{-1}$) of the first non-linear function is added (alternatively, configured) to (in) lower 4 bits and 0 is added (alternatively, inserted) to (into) upper 4 bits to output a total of 8 bits.

Figure 7:
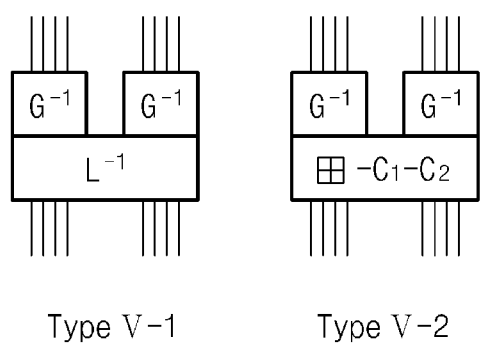

Type V-1 illustrated in FIG. 7 is shown by [Equation 20] given below.

$$L^{-1} \circ G^{-1} \quad \text{[Equation 20]}$$

As described above, in the case of type V-1, the controller 200 decodes an input of 8 bits based on the inverse function (for example, G$^{-1}$) of the first non-linear function among the plurality of non-linear functions and the inverse function (for example, L$^{-1}$) of the first linear function among the plurality of linear functions.

That is, in the case of type V-1, the controller 200 calculates 8 bits through two inverse functions (for example, G$^{-1}$) of the first non-linear function among the plurality of non-linear functions and calculates a calculation result of the inverse functions of two first non-linear functions through the inverse function (for example, L$^{-1}$) of the first linear function among the plurality of linear functions, and outputs a calculation result.

Further, type V-2 illustrated in FIG. 7 is shown by [Equation 21] given below.

$$ADD(-Const_1-Const_2, G^{-1}) \qquad \text{[Equation 21]}$$

As described above, in the case of type V-2, the controller 200 performs the law addition operation of the inverse function (for example, $G^{-1}$) of the first non-linear function among the plurality of non-linear functions and the sum (for example, Const(=$-Const_1-Const_2$)) of the plurality of constants with respect to the input of 8 bits to output a calculation result.

That is, in the case of type V-2, the controller 200 calculates 8 bits through two inverse functions (for example, $G^{-1}$) of the first non-linear functions among the plurality of non-linear functions and performs the law addition operation of the calculation result of the inverse functions of two non-linear functions and the sum (for example, −Const) of the plurality of constants to output the law addition operation result.

Figure 8:
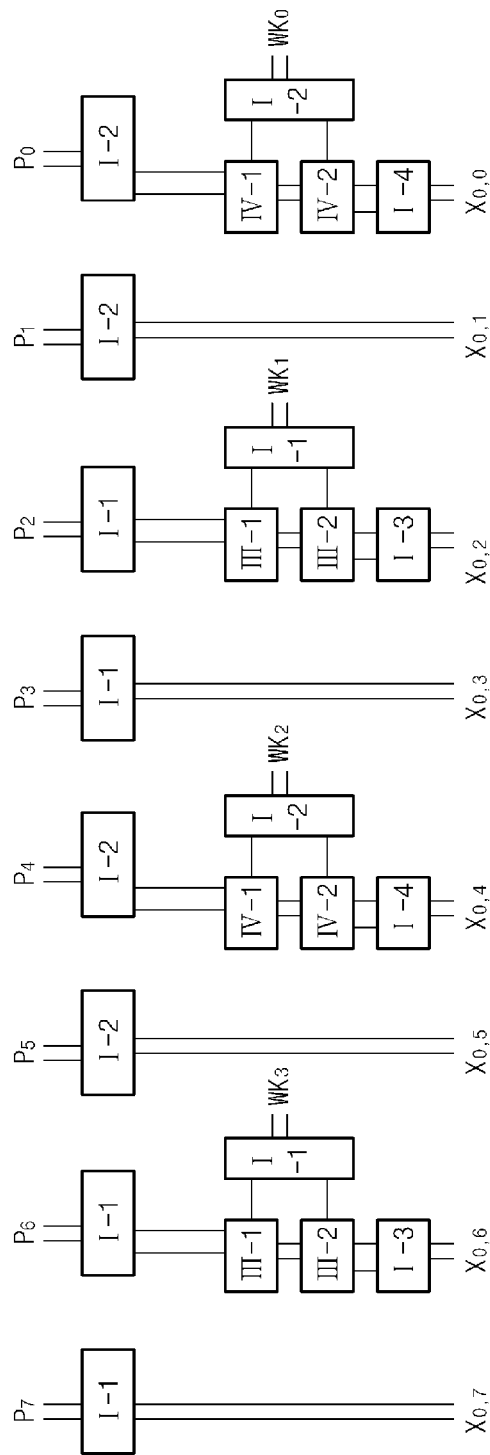
FIGS. 8 and 9 are diagrams illustrating an lookup table for final conversion included in the HIGHT algorithm according to the exemplary embodiment of the present invention.

In this case, as illustrated in FIG. 8, the controller 200 creates the lookup table for the initial conversion corresponding to [Equation 7] included in the HIGHT algorithm based on the plurality of non-linear functions, linear functions, and constants like types I-1, I-2, I-3, I-4, III-1, III-2, IV-1, and IV-2.

Figure 9:
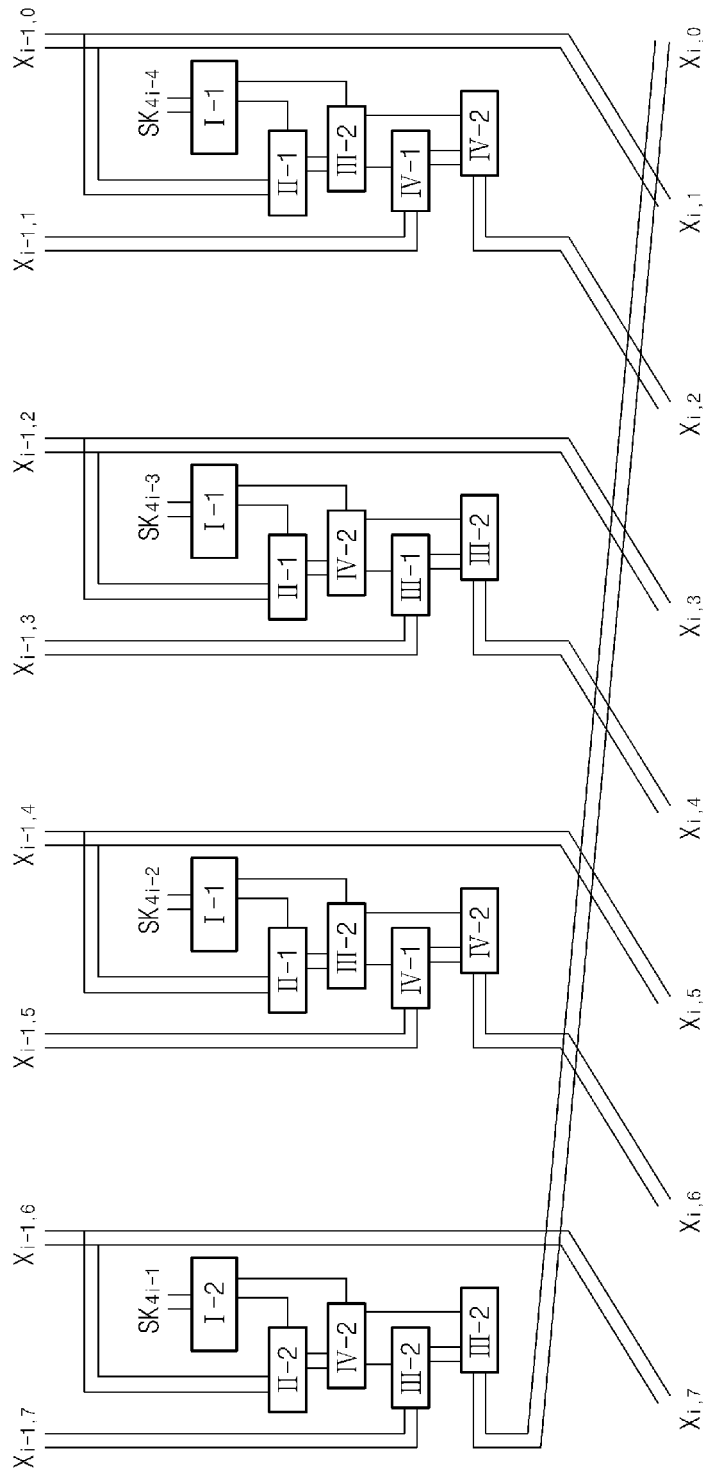

In this case, as illustrated in FIG. 9, the controller 200 creates the lookup table for the round function corresponding to [Equation 8] included in the HIGHT algorithm based on the plurality of non-linear functions, linear functions, and constants like types I-1, I-2, II-1, II-2, III-1, III-2, IV-1, and IV-2. In this case, in regard to the round function of the HIGHT algorithm, the function masking result applied to the initial conversion may be just transferred to the input of the final conversion or at least one encoding, function calculation, and decoding process may be performed based on a plurality of predetermined non-linear functions, linear functions, constants and thereafter, the corresponding performing result may be transferred as the input of the final conversion.

Figure 10:
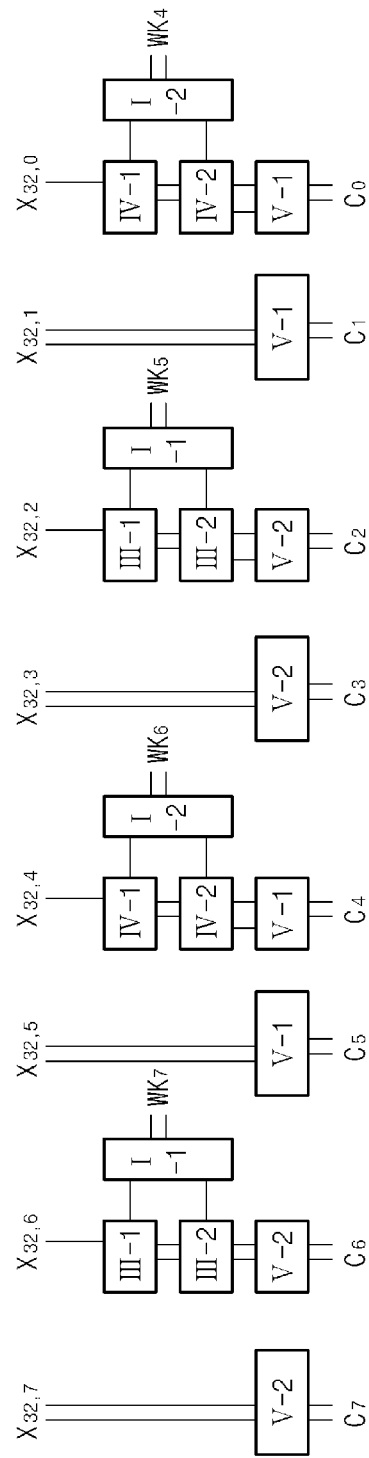
FIG. 10 is a diagram in which the HIGHT algorithm applied with the function masking is implemented according to the exemplary embodiment of the present invention.

Further, as illustrated in FIG. 10, the controller 200 creates the lookup table for the final conversion corresponding to [Equation 9] included in the HIGHT algorithm based on the plurality of non-linear functions, linear functions, and constants like types III-1, III-2, IV-1, IV-2, V-1, and V-2.

Further, the controller 200 generates (alternatively, implements) a final HIGHT algorithm in which the function masking is applied to the HIGHT algorithm based on the plurality of created lookup tables.

That is, when a predetermined plaintext P is received (alternatively, input), the controller 200 outputs a final cryptogram by referring to the corresponding lookup table for each bit included in the plaintext based on the created lookup table.

As illustrated in FIG. 10, finally, the controller 200 generates (alternatively, implements) the HIGHT algorithm applied with the function masking based on the created lookup table.

As described above, the function masking of the internal functions of the cryptographic algorithm may be provided.

Further as described above, the function masking may be applied to the symmetric cryptographic algorithm such as HIGHT.

Hereinafter, a method for controlling the function masking apparatus in a symmetric cryptographic algorithm according to the present invention will be described in detail with reference to FIGS. 1 to 11.

Figure 11:
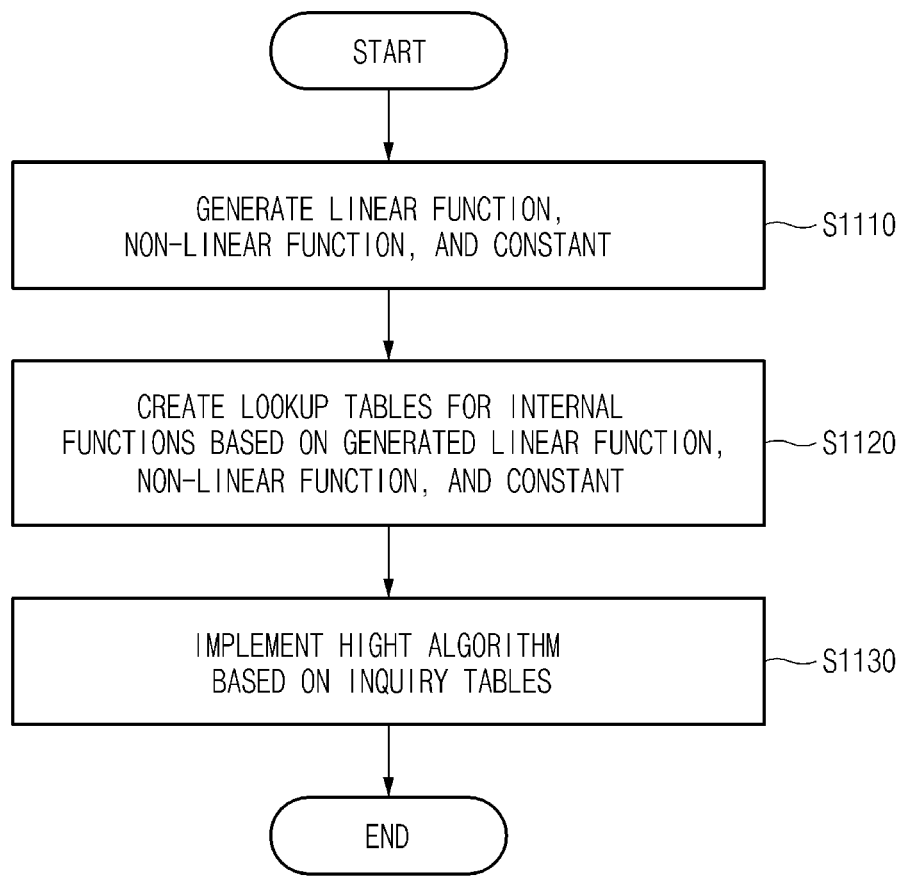
FIG. 11 is a flowchart illustrating a control method of a function masking apparatus in a symmetric cryptographic algorithm according to another exemplary embodiment of the present invention.

FIG. 11 is a flowchart illustrating a control method of a function masking apparatus in a symmetric cryptographic algorithm according to another exemplary embodiment of the present invention.

First, the controller 200 randomly generates the plurality of non-linear functions, the plurality of linear functions, and the plurality of constants. In addition, the controller 200 temporarily stores the plurality of non-linear functions, the plurality of linear functions, and the plurality of constants, which are generated, in the storage unit 100.

As one example, the controller 200 randomly generates each of two 4-bit non-linear functions (for example, G and H) and two 8-bit linear functions (for example, L and M) for the HIGHT function masking, and a 8-bit constant Const (=$Const_1+Const_2$) for a linear function for addition (S1110).

Thereafter, the controller 200 creates the lookup table (or look-up table) for each of one or more internal functions included in the HIGHT algorithm based on the plurality of non-linear functions, the plurality of linear functions, and the plurality of constants which are generated.

That is, the controller 200 creates the lookup table for each of the function corresponding to the initial conversion included in the HIGHT algorithm, the round functions of rounds 1 to 32, and the function corresponding to the final conversion.

As one example, as illustrated in FIGS. 3 to 7, the controller 200 creates the lookup tables for [Equation 7], [Equation 8], and [Equation 9] included in the HIGHT algorithm (S1120).

Thereafter, the controller 200 generate (alternatively, implements) the final HIGHT algorithm in which the function masking is applied to the HIGHT algorithm based on the created lookup tables.

As one example, as illustrated in FIGS. 8 to 10, the controller 200 generates the HIGHT algorithm applied with the function masking based on the lookup tables illustrated in FIGS. 3 to 7.

Further, after generating (alternatively, implementing) the final HIGHT algorithm based on the plurality of non-linear functions, the plurality of linear functions, and the plurality of constants, the controller 200 deletes the plurality of non-linear functions, the plurality of linear functions, and the plurality of constants temporarily stored in the storage unit 100.

That is, when a predetermined plaintext is received (alternatively, input), the controller 200 outputs the final cryptogram by referring to the corresponding lookup table for the received plaintext based on the created lookup table (S1130).

According to the exemplary embodiments of the present invention, as described above, function masking of internal functions of a cryptographic algorithm is provided to efficiently respond to high-order differential power analysis attacks because the internal functions of the cryptographic algorithm cannot be predicted.

Further, according to the exemplary embodiments of the present invention, as described above, function masking is applied to a symmetric cryptographic algorithm such as a HIGHT to improve efficiency of an entire system.

Those skilled in the art can modify and change the above description within the scope without departing from an essential characteristic of the present invention. Accordingly, the embodiments disclosed herein are intended not to limit but to describe the technical spirit of the present invention, and the scope of the technical spirit of the present invention is not limited to the embodiments. The scope of the present invention may be interpreted by the appended claims and all the technical spirits in the equivalent range thereto are intended to be embraced by the claims of the present invention.

What is claimed is:

1. A function masking apparatus for preventing side channel attacks in symmetric cryptography that utilizes a plurality of internal functions, the apparatus comprising:
a controller including a processor that is configured to execute program instructions to
randomly generate a plurality of non-linear functions, a plurality of linear functions, and a plurality of constants for the internal functions of the symmetric cryptography,
for each of the plurality of internal functions,
create a lookup table that includes a plurality of operations, through which at least two functions or constants selected from the plurality of non-linear functions, the plurality of linear functions, and the plurality of constants are used to convert an input to said each internal function to obtain a converted result,
mask said each internal function by using the converted result as an output of said each internal function, and
encrypt a plaintext using the masked internal functions; and
a storage unit storing the created lookup tables for the plurality of internal functions.

2. The apparatus of claim 1, wherein at least one of the non-linear functions is a 4-bit function for a confusion effect and at least one of the linear functions is an 8-bit function for a diffusion effect.

3. The apparatus of claim 1, wherein the plurality of internal functions includes a function of initial conversion, a round function, and a function of final conversion.

4. A function masking method of a function masking apparatus including a controller for preventing side channel attacks in symmetric cryptography that utilizes a plurality of internal functions, the method comprising:
randomly generating, by the controller, a plurality of non-linear functions, a plurality of linear functions, and a plurality of constants for the symmetric cryptography;
for each of the plurality of internal functions,
creating, by the controller, a lookup table that includes a plurality of operations, through which at least two functions or constants selected from the plurality of non-linear functions, the plurality of linear functions, and the plurality of constants are used to convert an input to said each internal function to obtain a converted result,
masking, by the controller, said each internal function by using the converted result as an output of said each internal function, and
encrypting, by the controller, a plaintext using the masked internal functions.

5. The method of claim 4, wherein:
the plurality of internal functions include at least one of a modular addition function, an XOR function, and auxiliary functions F0, and F1, the auxiliary function F0 corresponding to an XOR operation of a plurality of values which are left cyclic shifted by 1 bit, 2 bits, and 7 bits of a 8-bit value, the auxiliary function F1 corresponding to the XOR operation of a plurality of values which are left cyclic shifted by 3 bits, 4 bits, and 6 bits of the 8-bit value.

* * * * *